US011998944B2

(12) United States Patent
Hickmott et al.

(10) Patent No.: US 11,998,944 B2
(45) Date of Patent: Jun. 4, 2024

(54) AUTONOMOUS DISPENSING EFFECTOR UNIT FOR A ROBOTIC ARM

(71) Applicant: AIM ROBOTICS APS, Søborg (DK)

(72) Inventors: Mie Haraldsted Hickmott, Søborg (DK); Henrik Haraldsted, Søborg (DK); Karlis Akis, Søborg (DK)

(73) Assignee: Aim Robotics ApS, Søborg (DK)

(*) Notice: Subject to any disclaimer, the term of this patent is extended or adjusted under 35 U.S.C. 154(b) by 247 days.

(21) Appl. No.: 17/630,376

(22) PCT Filed: Aug. 7, 2020

(86) PCT No.: PCT/EP2020/072281
§ 371 (c)(1),
(2) Date: Jan. 26, 2022

(87) PCT Pub. No.: WO2021/023871
PCT Pub. Date: Feb. 11, 2021

(65) Prior Publication Data
US 2022/0280968 A1 Sep. 8, 2022

(30) Foreign Application Priority Data
Aug. 8, 2019 (EP) .................................... 19190710

(51) Int. Cl.
B05C 5/02 (2006.01)
B25J 15/00 (2006.01)

(52) U.S. Cl.
CPC ......... *B05C 5/0225* (2013.01); *B25J 15/0019* (2013.01)

(58) Field of Classification Search
CPC ... B05C 5/0225; B05C 5/0216; B25J 15/0019
USPC ....................................................... 222/412
See application file for complete search history.

(56) References Cited

U.S. PATENT DOCUMENTS

| 5,165,961 A | 11/1992 | Freeman |
| 2004/0124292 A1 | 7/2004 | Giuliano |
| 2010/0180711 A1 | 7/2010 | Kilibarda et al. |
| 2010/0260531 A1 | 10/2010 | Rademacher |
| 2016/0263615 A1 | 9/2016 | Tanaka et al. |

OTHER PUBLICATIONS

International Preliminary Report on Patentability mailed Feb. 17, 2022 in International Application No. PCT/EP2020/072281, 7 pages.
International Search Report and Written Opinion of the ISA for PCT/EP2020/072281, mailed Nov. 10, 2020, 11 pages.

*Primary Examiner* — Vishal Pancholi
(74) *Attorney, Agent, or Firm* — Nixon & Vanderhye P.C.

(57) ABSTRACT

The present invention relates to an autonomous dispensing effector unit for a robotic arm, comprising an effector body, a fluid container attached to the effector body, a dispensing actuator unit attached to the effector body, a controlling means for controlling the dispensing from the effector unit, and an interface to the controlling means providing power to the autonomous dispensing effector unit, wherein the dispensing actuator unit and/or the effector body is in fluid communication with the fluid container.

14 Claims, 11 Drawing Sheets

Figure 1:
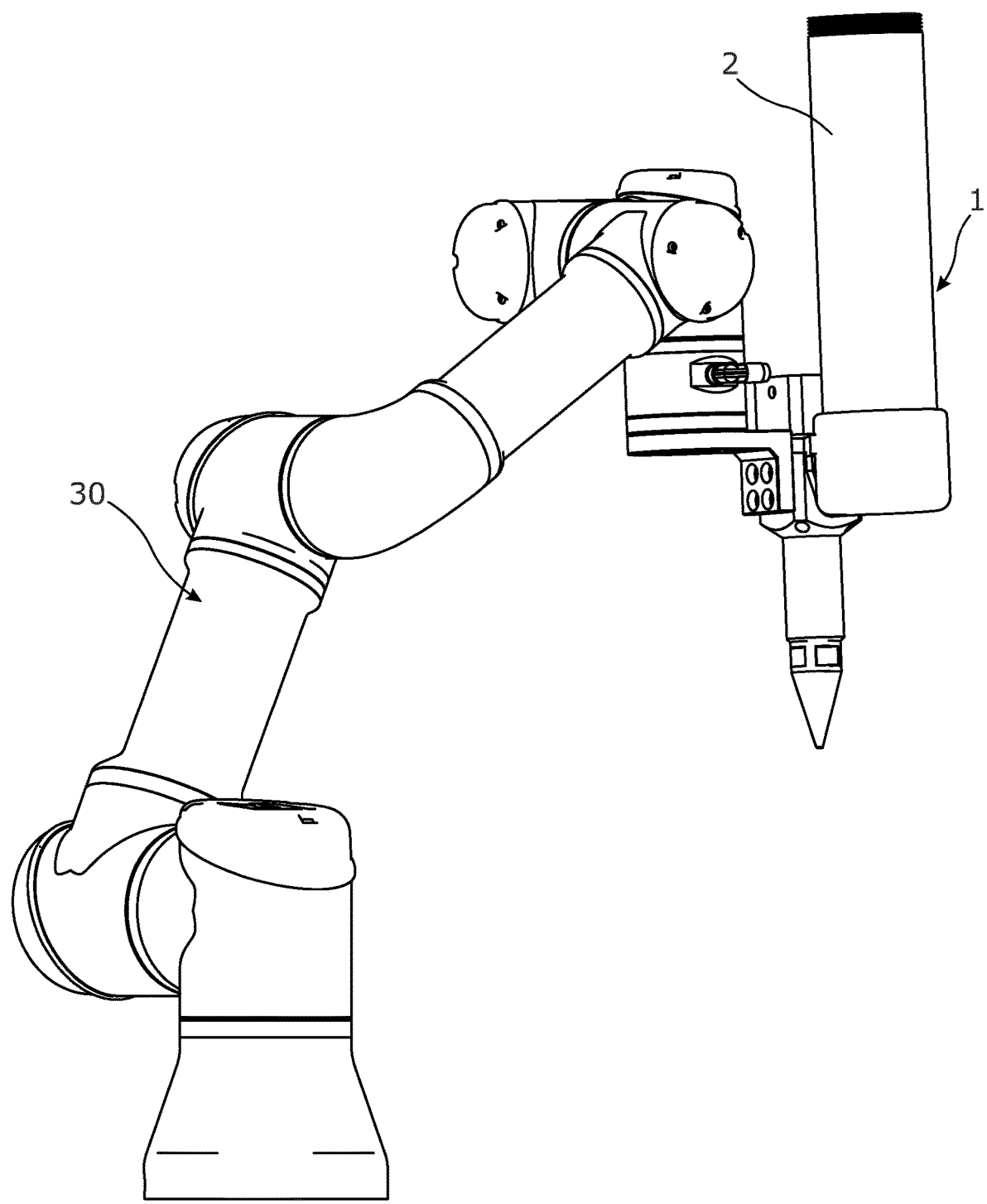

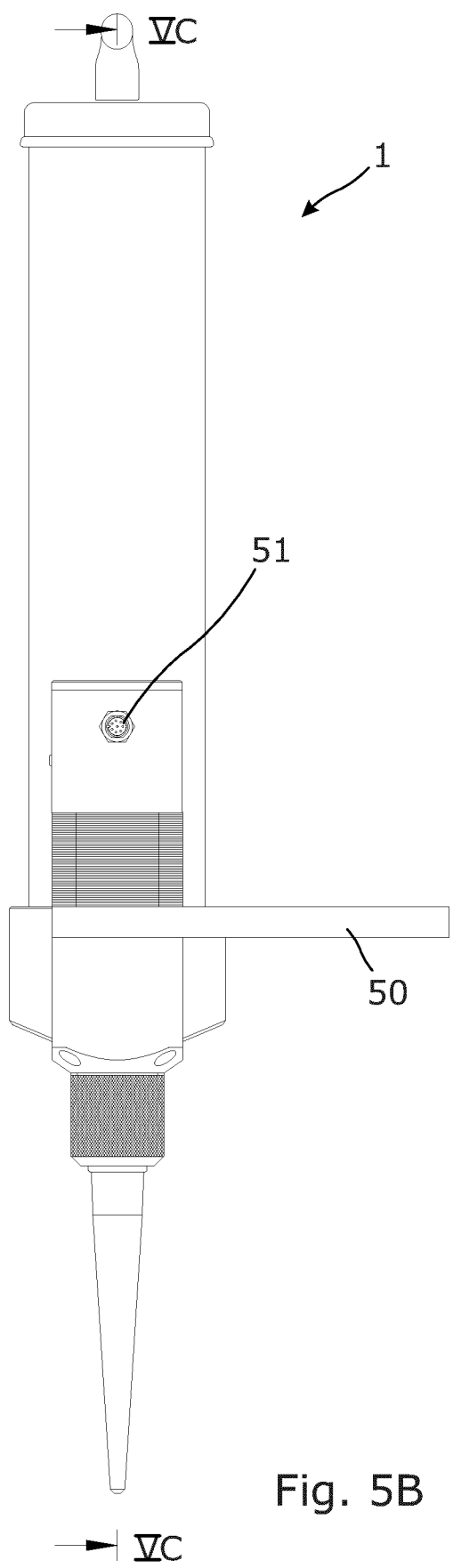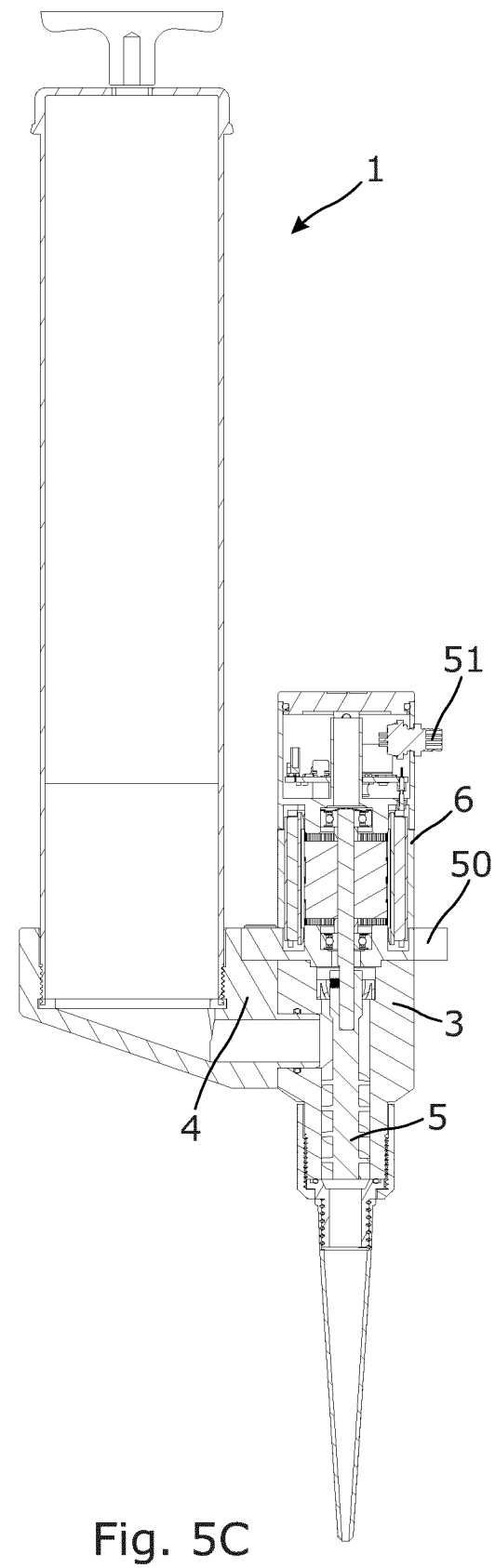
Fig. 5B
Fig. 5C

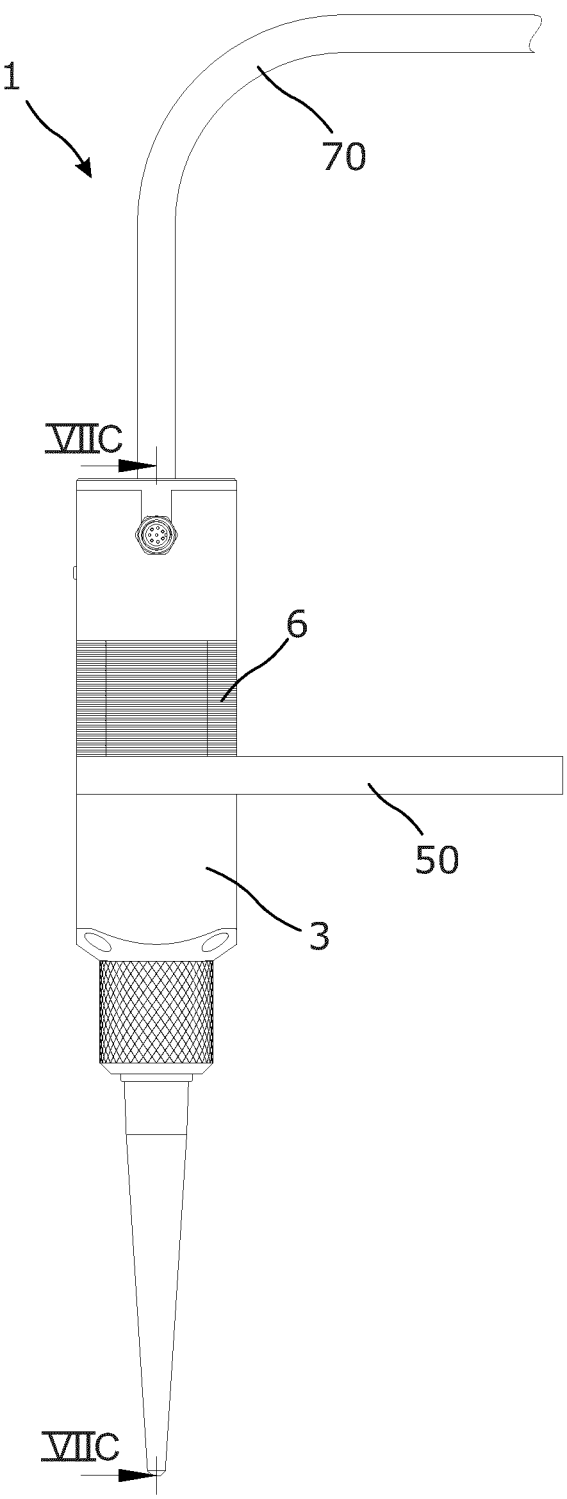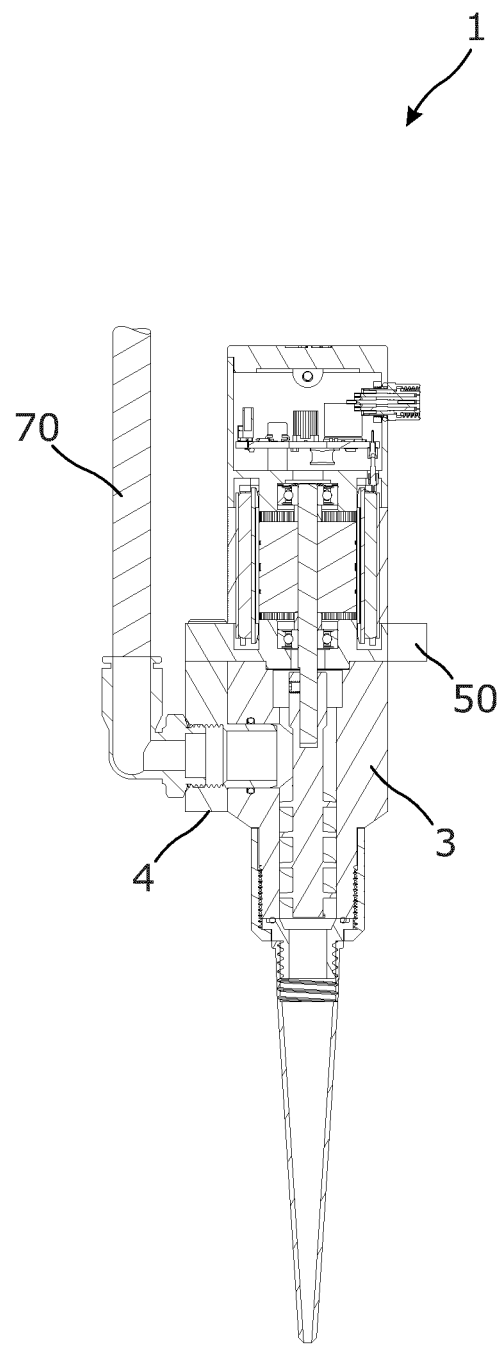
Fig. 7B
Fig. 7C

AUTONOMOUS DISPENSING EFFECTOR UNIT FOR A ROBOTIC ARM

This application is the U.S. national phase of International Application No. PCT/EP2020/072281 filed 7 Aug. 2020, which designated the U.S. and claims priority to EP Patent Application No. 19190710.4 filed 8 Aug. 2019, the entire contents of each of which are hereby incorporated by reference.

The present invention relates to an autonomous dispensing effector unit for a robotic arm.

For many years, robots have been an alternative to manual labour. In this context, the robots discussed in the present application are robotic arms and not humanoid robots—the terms robotic arm and robot will be used interchangeably. The cost of purchasing a robot has dropped significantly over the last years. Furthermore, robots are becoming increasingly easy to re-programme, and hence, the use of robots is likely to change during its service in a company. Traditionally, the primary functions of robots have been welding, grabbing objects and vision systems for controlling the appearance of objects. The easy reprogramming of robots renders it feasible over time to change the job function performed by a robot, i.e. to introduce a much more flexible and adaptable approach to the use of the robot. However, the robotic arm still needs to be equipped with an end effector, effector or end of arm unit in order to perform the desired function. In robotics, an effector or end effector is considered to be the device at the end of a robotic arm, designed to interact with the environment. The exact nature of this device depends on the application of the robot. In the narrow definition, which originates from serial robotic manipulators, the end effector means the last link (or end) of the robotic arm. At this endpoint, the tools are attached. In a wider sense, the definition used in the present application is that an effector (end effector) is defined as a detachable part of a robot that interacts with the work environment. The "autonomous dispensing effector unit" may in the present application be called "effector unit" or "dispensing unit" or "dispensing effector unit" or the "effector" and all refer to the autonomous dispensing effector unit. Hence, the robot/robotic arm positions the effector in order for the effector to perform an operation at a desired location. This may also be a continuous operation during the motion of the robotic arm e.g. dispensing a fluid from the effector unit during such motion.

The effector is considered to be autonomous when it comprises its own computer in order to handle the actions of the effector unit to be performed e.g. dispensing. The effector unit may receive an on/off signal from the robot, but this may also be controlled directly in the effector unit. Hence, the term autonomous relates to the capabilities of the computer power in the effector unit i.e. it may receive signals from the robot if this is the simplest way to control the effector unit, but it may also operate fully without input from the robot.

Various functions may be performed by the effector; therefore, the effector itself may be complex, and setting it in use is a complicated process.

It is an object of the present invention to wholly or partly overcome the above disadvantages and drawbacks of the prior art. More specifically, it is an object to provide an improved dispensing effector that simplifies use of the effector.

It is a further object of the present invention to support the different uses of the robotic arm i.e. rendering it easy to shift the effect to another robot the effector should not be difficult to use or to mount.

The above objects, together with numerous other objects, advantages and features, which will become evident from the below description, are accomplished by a solution in accordance with the present invention by an autonomous dispensing effector unit for a robotic arm, comprising:
- an effector body,
- a fluid container attached to the effector body,
- a dispensing actuator unit attached to the effector body,
- a controlling means for controlling the dispensing from the effector unit, and
- an interface to the controlling means providing power to the autonomous dispensing effector unit, wherein the dispensing actuator unit and/or the effector body is in fluid communication with the fluid container In this way, it is easy to interchange the effector since the only function that is required to be interfaced with the controlling of the robot is a stop/start function of or in the effector. This simplicity is due to the fact that all other operations have been automated and controlled in the effector itself. Since the controlling means of the dispensing effector unit is positioned in the effector unit itself a minimum to no interaction with the robot is required. In this way the effector unit may be kept autonomous.

In an item the present invention provides an autonomous dispensing effector unit for a robotic arm, comprising:
- an effector body,
- a fluid container attached to the effector body, the fluid container comprising a piston,
- a dispensing actuator unit attached to the effector body,
- a controlling means for controlling the dispensing from the effector unit, and
- an interface to the controlling means providing power to the autonomous dispensing effector unit, wherein the dispensing actuator unit is in fluid communication via a channel in the effector body.

The dispensing actuator unit may further comprise a mechanical screw for dispensing the fluid from the fluid container.

In this way, it is possible to precisely adjust the amount of fluid to be dispensed from the mechanical screw, i.e. the dispensing actuator unit.

Furthermore, the mechanical screw may be driven by a stepper motor.

In this way, it is possible to easily control the dispensing from the mechanical screw.

Also, the stepper motor may be arranged in the dispensing actuator unit.

Additionally, the rotating means may be a stepper motor.

In this way, it is possible to achieve the desired precision of dispensing by simply adjusting the precision of the stepper motor.

Furthermore, the fluid container may comprise an energy source detached from the energy source of the dispensing actuator unit.

In one embodiment the fluid container may be an open fluid container. In this way it is possible to fill the container simply by moving the robot and hence the fluid container to a position of refilling. In one embodiment the fluid container may be a fluid tube connected to an additional fluid container. In this way, it is possible to have an additional fluid container at another location with the additional fluid container in fluid communication with the fluid tube. The tube itself may be a fluid container.

Also, the fluid container may be slidably arranged on the effector body.

In this way, it is possible to quickly interchange one fluid container with another.

Hence, having the right interfacing means for attaching the container unit to the dispensing unit ensures a smooth and easy interchangeability.

Moreover, the dispensing actuator unit may comprise an electrical interface to the control unit of the robot.

In this way, it is achieved that the dispensing effector unit dispenses the fluid from the fluid container according to the position of the robotic arm.

Further, the pressure in the fluid container may be obtained by energy means different from those driving the dispensing actuator unit.

Additionally, the pressure from the fluid container may be sufficient to ensure that the fluid is capable of ejecting from the nozzle of the dispensing actuator unit.

Hence, the dispensing actuator unit only serves to ensure a correct amount to be dispensed, i.e. similar to opening and closing the nozzle.

Also, the energy means for the fluid container may be a spring, pressurized air, a battery-driven motor or gas.

Moreover, the effector body may be integrated into either the fluid container or the dispensing actuator unit.

In one embodiment the fluid container may comprise a piston. In this way it is possible to dispense the fluid in the fluid container in a simple way. The dispensing may be without the use of pressurized air.

In one embodiment the dispensing actuator unit may comprise one or more accelerometers. The accelerometers supply movement information to the controlling unit. In this way it is possible to determine movement for the controlling of the dispensing and thereby further improve the autonomy and/or the accuracy of the dispensing effector unit.

In this way, it is possible to make the dispensing effector unit smaller and/or have lower weight.

Furthermore, the fluid to be dispensed may be a high viscous fluid, e.g. grease, silicone or glue.

Additionally, the interface from the effector body to the fluid container may be a tongue and groove connection.

In one embodiment the fluid container may comprise a spring loaded piston. In this way, the orientation of the fluid container during expelling of fluid from the fluid container does not rely on gravity. The piston may be spring loaded.

In one embodiment the effector body may comprise an effector flange arranged between the controlling means and the fluid dispensing actuator unit. In this way it is possible to provide an even surface that ensures alignment of the other parts.

In one embodiment the effector flange and the effector body may be one integrated unit. In this way a more compact dispensing effector unit may be provided.

In one embodiment the electrical interface may be connected to a power source on the effector itself e.g. a battery. In this way the effector may be free of any wires for supplying power. In this way it is achieved that the effector may be used in more complex structures without getting entangled in the wire e.g. when requiring that the arm of the is rotating.

In one embodiment the controlling means may be arranged further away from the nozzle than the dispensing actuator unit. In this way it is possible to position the more fragile parts away from e.g. hot, or magnetic or acidious fluids.

In one embodiment the effector flange may be arranged between the stepper motor and the outlet from the fluid container. In this way, it is easy to slide the fluid container in place and thereby ensure a correct positioning in relation to the effector body and the dispensing actuator unit.

Furthermore, the tongue and groove may be dovetail shaped. In this way, it is achieved that the tongue and groove connection affixe the fluid container in two directions perpendicular to each other.

Finally, the autonomous dispensing effector unit may be used for performing dispensing of fluids in patterns according to the movement of the robotic arm to which it is mounted.

Figure 2:
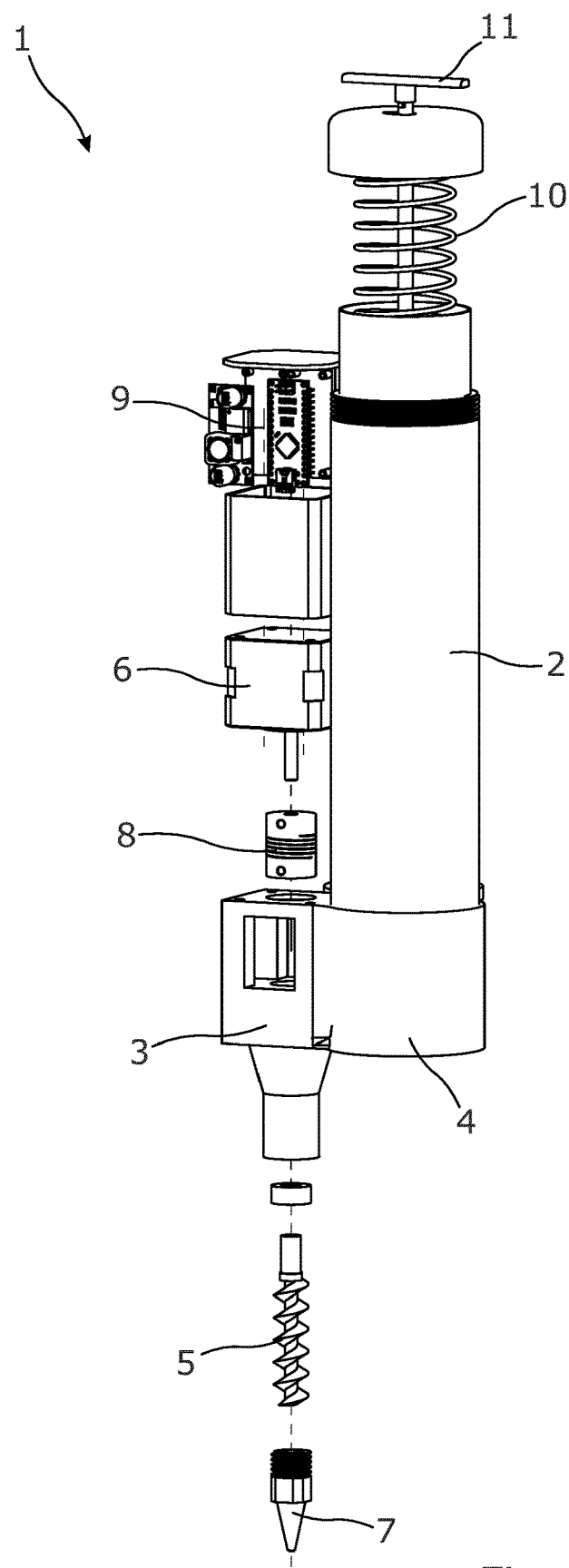
Figure 3:
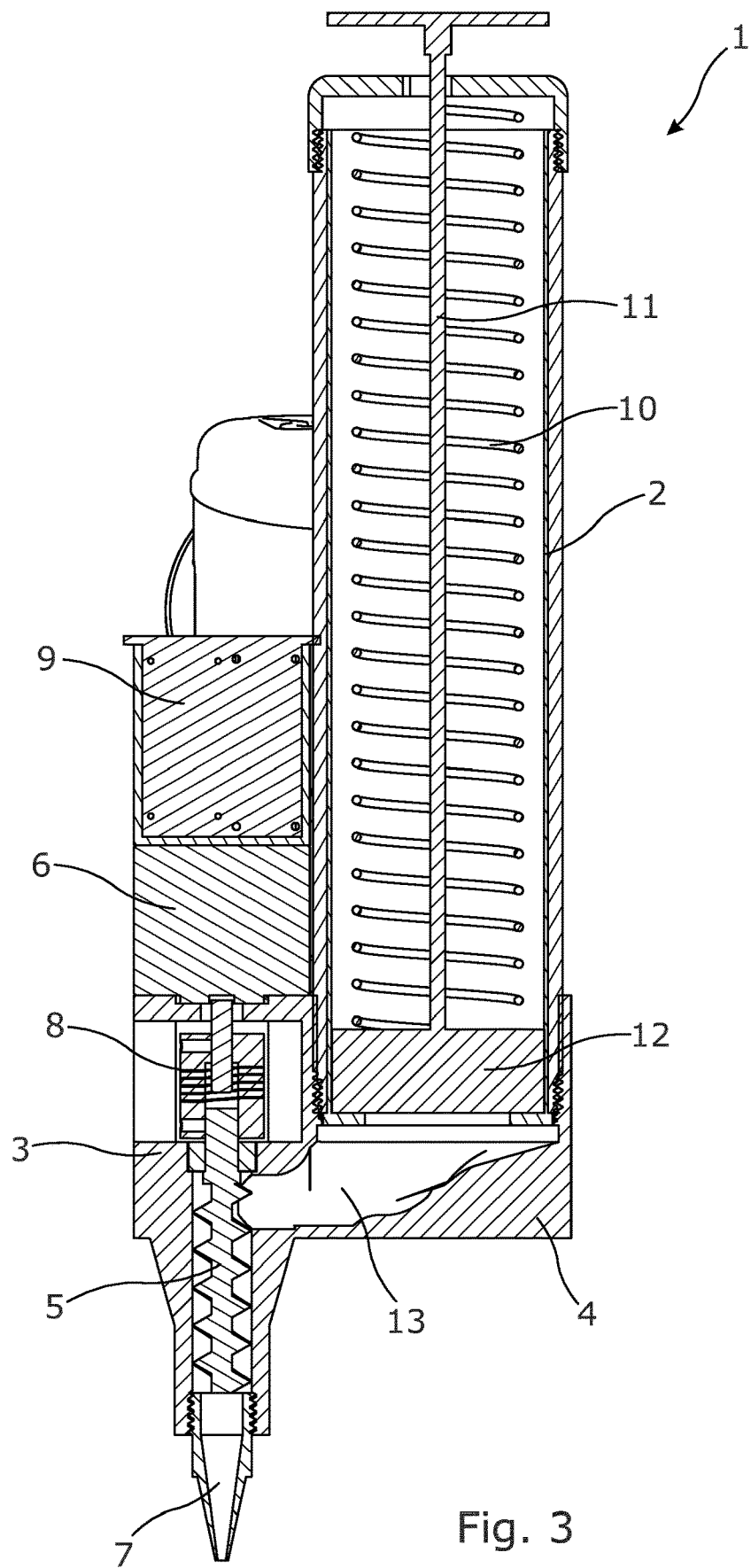
Figure 4:
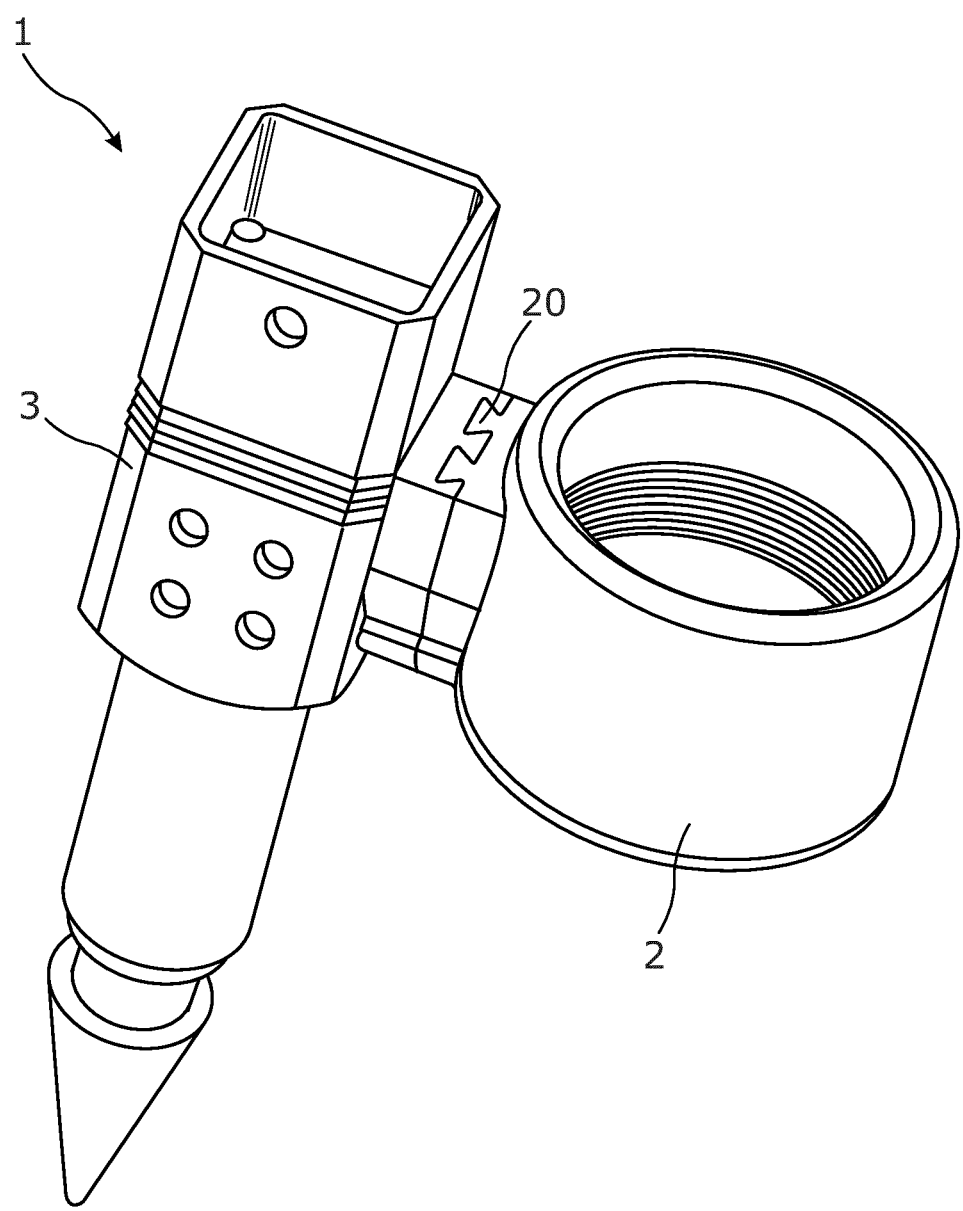
Figure 5A:
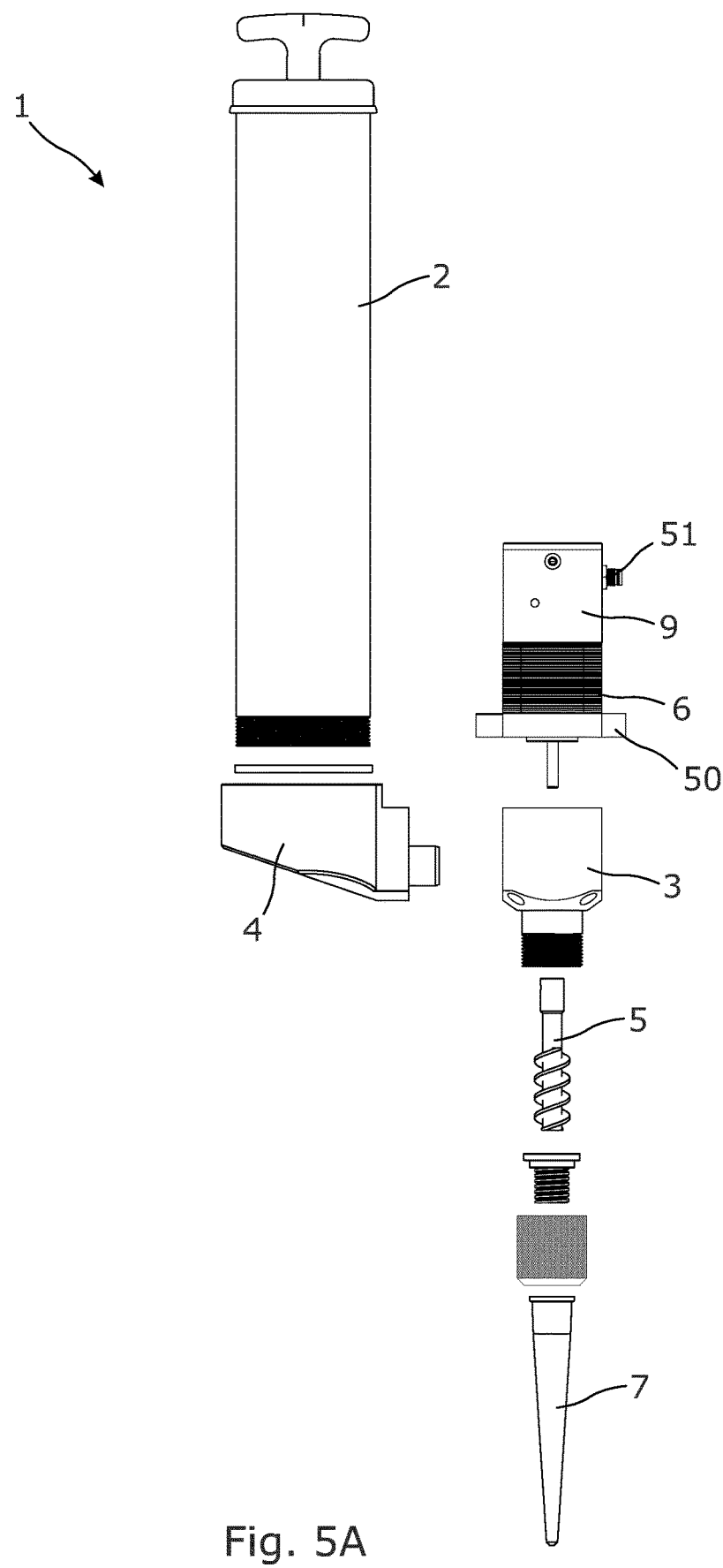
Figure 6A:
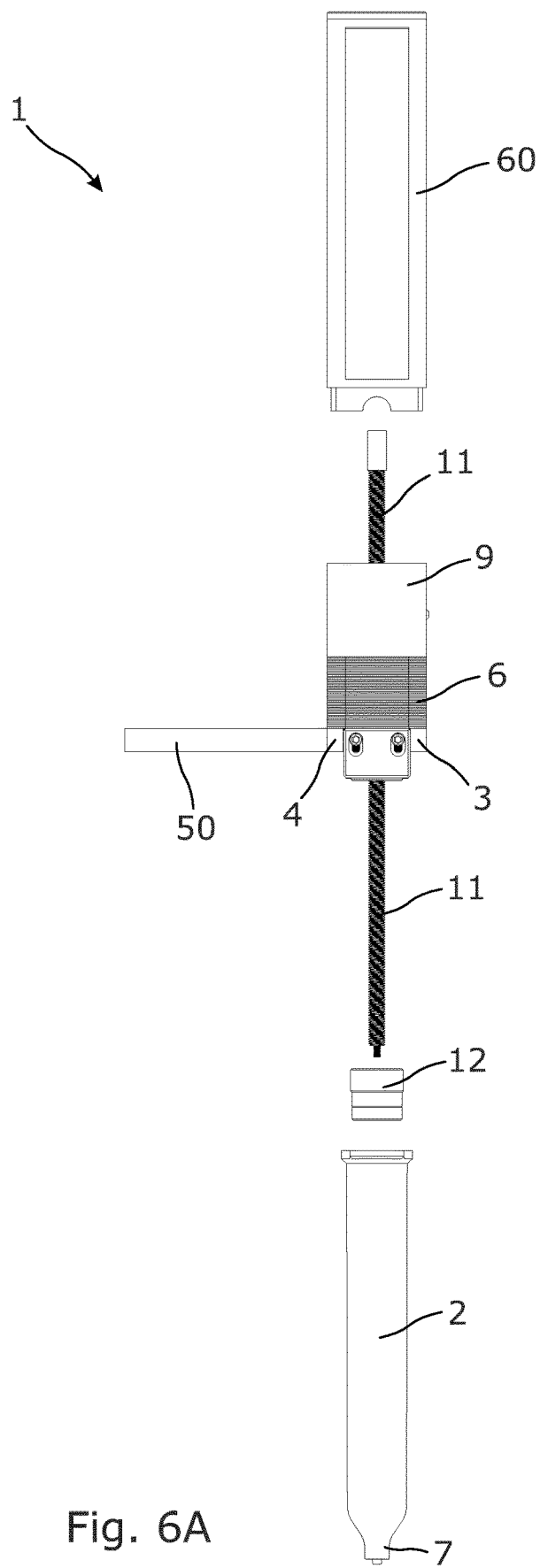
Figures 6B, 6C:
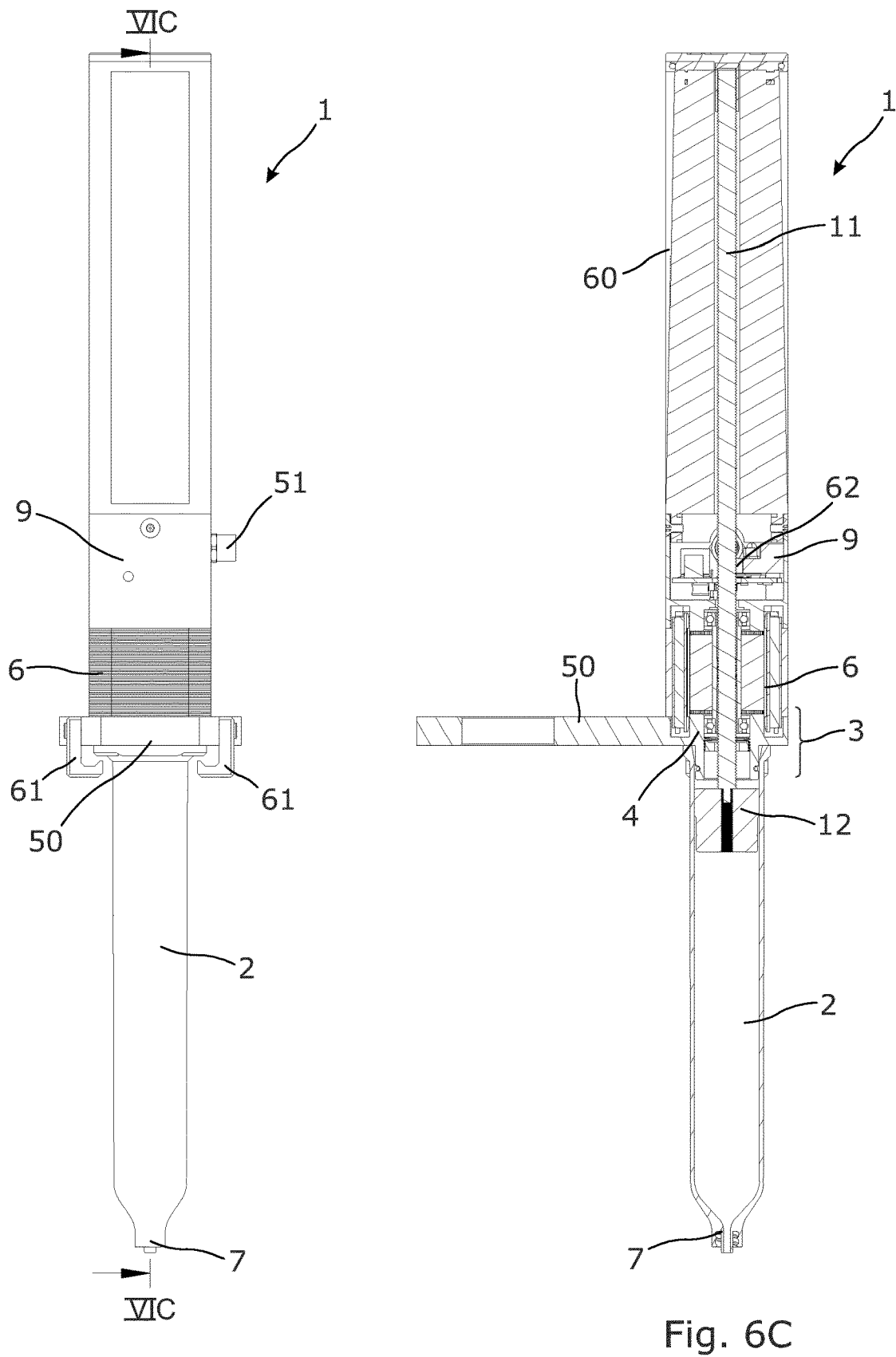
Figure 7A:
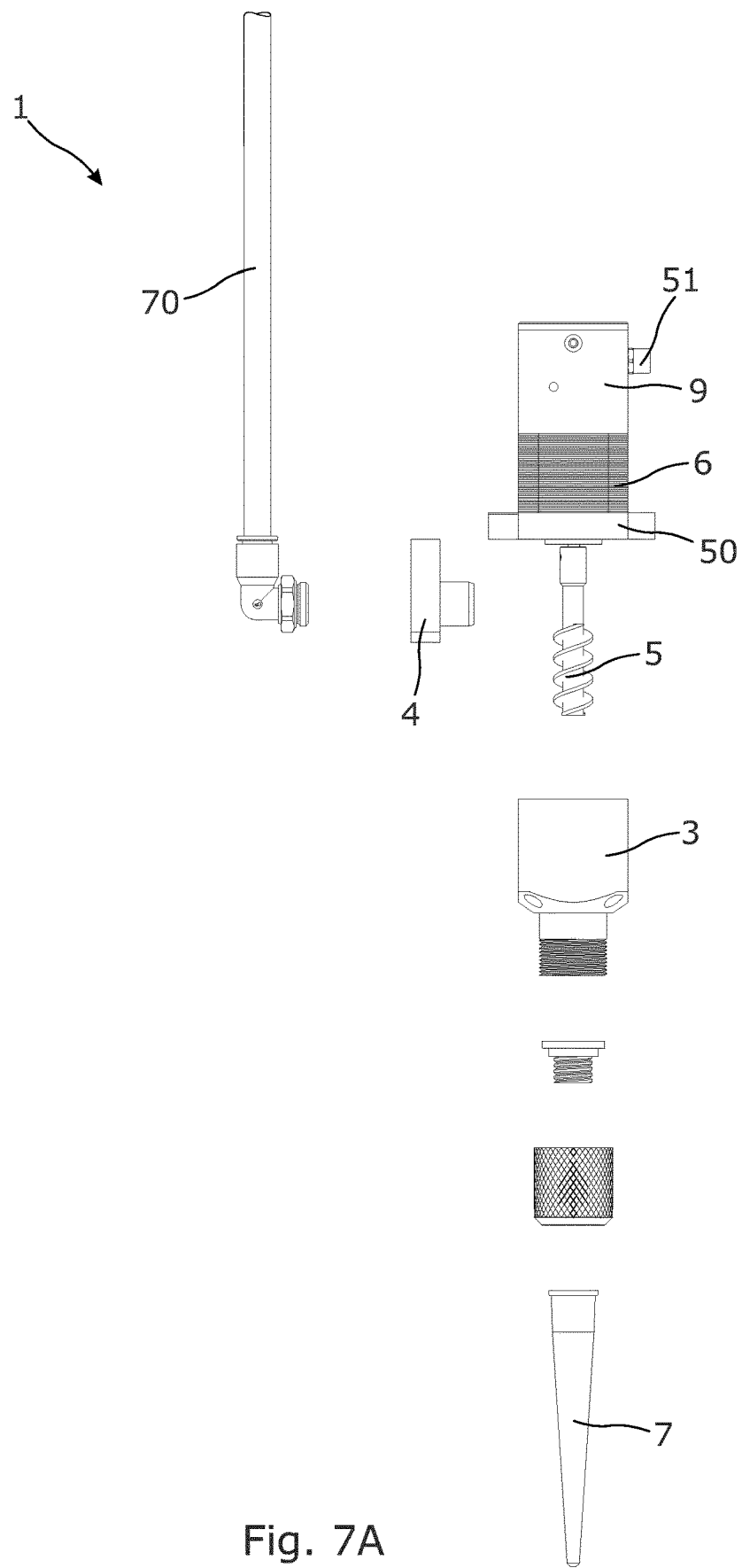
Figure 8:
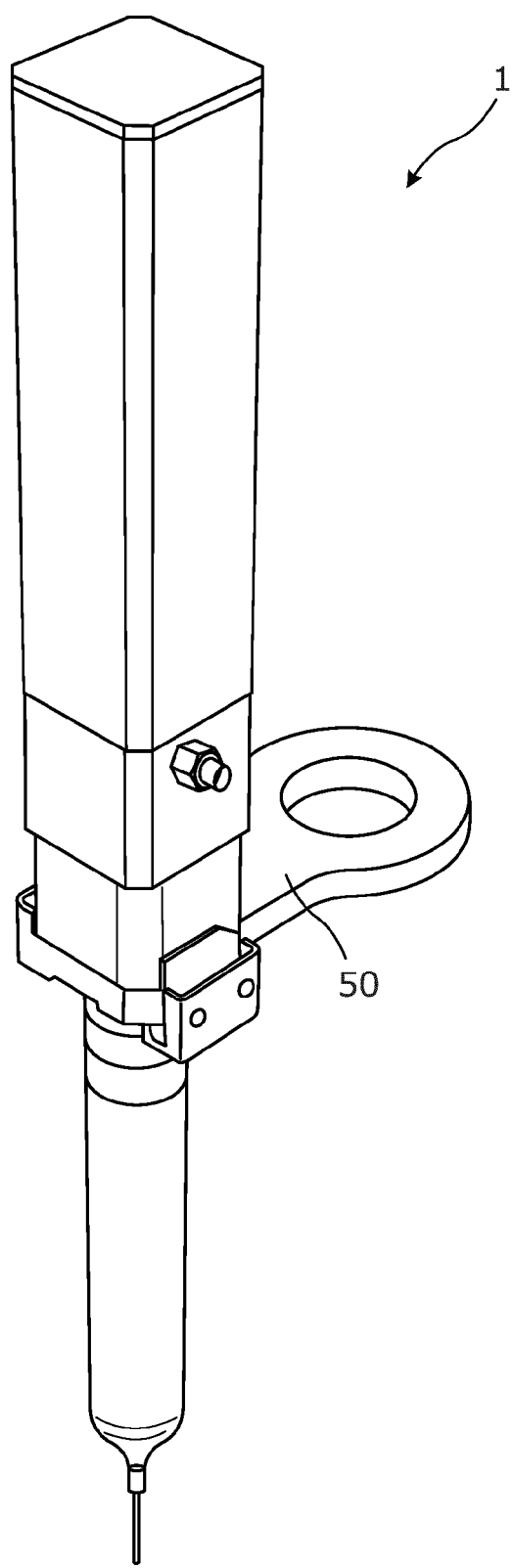

The invention and its many advantages will be described in more detail below with reference to the accompanying schematic drawings, which for the purposes of illustration show some non-limiting embodiments and in which:

FIG. 1 shows an autonomous dispensing effector unit mounted on a robotic arm,

FIG. 2 shows an autonomous dispensing effector unit for dispensing fluids in a partly exploded view, FIG. 3 shows the autonomous dispensing effector unit of FIG. 2 in a cross-sectional view, FIG. 4 shows a perspective view of an embodiment of the autonomous dispensing effector unit, FIG. 5A shows in a partly exploded view one embodiment of the invention, FIG. 5B shows in a side view the embodiment shown in FIG. 5A, FIG. 5C shows in a cross-sectional view the embodiment shown in FIGS. 5A and 5B FIG. 6A shows in a partly exploded view one embodiment of the invention, FIG. 6B shows in a side view the embodiment shown in FIG. 6A, FIG. 6C shows in a cross-sectional view the embodiment shown in FIGS. 6A and 6B FIG. 7A shows in a partly exploded view one embodiment of the invention, FIG. 7B shows in a side view the embodiment shown in FIG. 7A, FIG. 7C shows in a cross-sectional view the embodiment shown in FIGS. 7A and 7B, and FIG. 8 is a perspective view of the embodiment shown in FIG. 6A-6C.

All the figures are highly schematic and not necessarily to scale, and show only those parts which are necessary in order to elucidate the invention, other parts being omitted or merely suggested.

FIG. 1 shows an autonomous dispensing effector unit 1 mounted on a robotic arm 30. The robotic arm may be mounted in a stationary way, e.g. to the floor or on a table depending on the size of the robot and the environment of use. The autonomous dispensing effector unit 1 is indifferent to how the robot is mounted or used since the only signal needed for the autonomous dispensing effector unit to operate is an on/off signal. This means that it may be as simple as turning the power to the unit on and off, and the unit will start dispensing the fluid in the fluid container 2. It is to be understood that the autonomous dispensing effector unit may be driven by a wire power supply or battery, and it may also retrieve information or data from the control system of the robot, but in its simplest embodiment this information is not necessary.

FIG. 2 shows an autonomous dispensing effector unit 1 for dispensing a fluid. The fluid container 2 is connected to a dispensing actuator unit 3 via an effector body 4. The dispensing actuator unit 3 comprises a mechanical screw 5 driven by a motor 6, e.g. a stepper motor. The mechanical screw 5 forces the fluid (not shown) out of a nozzle 7. The stepper motor 6 is connected to the mechanical screw 5 via a flexible coupling 8. The stepper motor 6 is controlled by electrical controlling means 9. In this embodiment, the fluid from the fluid container 2 is forced towards the mechanical screw 5 via the effector body 4 by a spring 10 acting on a piston (not visible) or piston rod 11. Before putting the fluid in the fluid container 2, a piston rod 11 is pulled to a top position, i.e. where the spring 10 is fully compressed, and when fluid is used, i.e. dispensed via the mechanical screw 5, the piston rod 11, i.e. the piston 12 itself, moves to a bottom position. When the piston rod 11 is in the bottom position, the fluid container 2 is empty. The fluid container 2 may be configured to receive a fluid insert or fluid cartridge, whereby the fluid container itself is not in direct contact with the fluid. This may render cleaning easier and facilitate an even faster change to a different fluid. Such fluid insert or cartridge may then comprise the piston to force the fluid out of the insert/cartridge.

FIG. 3. shows the autonomous dispensing effector unit 1 in a cross-sectional view. In this view, it is shown that the piston rod 11 and hence the piston 12 is substantially in the bottom of the fluid container meaning that the fluid container 2 is empty. The spring 10 is fully extended. In this view, it is shown that a fluid passage 13 connects the fluid container 2 with the mechanical screw 5, i.e. facilitating that fluid may flow from the fluid container 2 to the dispensing actuator unit 3. When activating the mechanical screw 5, the fluid will be forced to the nozzle 7 and sprayed or expelled from said nozzle.

FIG. 4 shows a further embodiment of the autonomous dispensing effector unit, where the fluid container 2 (only the lower part of the fluid container is shown) is connected to the dispensing actuator unit 3 via a sliding dovetail connection 20. This connection still facilitates that a fluid passage is present, and hence, the transfer of fluid from the fluid container 2 to the dispensing actuator unit 3 is the same as that of FIG. 2 and FIG. 3.

FIGS. 5A, 5B and 5C shows one embodiment of the autonomous dispensing effector unit 1. Reference numerals to one feature shown in one of the figures will be the same in the other figures and may not necessarily be indicated with a reference numeral in more than one of the figures.

FIG. 5A shows in a partly exploded view one embodiment of the autonomous dispensing effector unit 1. In this embodiment the fluid container 2 is connected to the effector body 4. The effector body 4 is connected to the effector flange 50. In this embodiment the effector flange 50 and the effector body 4 are two separate parts but in other embodiments these may be integrated into one part. The effector body 4 is connected to the dispensing actuator unit 3. In this embodiment a stepper motor 6 is connected to a mechanical screw 5 in order to move the fluid from the fluid container 2 to the nozzle 7. The fluid from the fluid container 2 is fed to the dispensing actuator unit 3 via the effector body 4. An electrical controlling means 9 comprising an electrical interface 51 is connected to the stepper motor 6. It is to be understood that for all embodiments of the present invention the stepper motor and the electrical controlling means 9 may swap positions with minor modifications i.e. a longer shaft and a throughgoing hole in the controlling means 9.

FIG. 5B shows in a side view the embodiment shown in FIG. 5A. It is shown that the effector flange 50 provides a clearance to which a robotic arm (not shown) may be connected. In this way, the parts of the dispensing effector unit 1 need not be dismantled in order to attach or release the dispensing effector unit 1 from the robotic arm. Furthermore, in this view the electrical interface 51 is easily seen.

FIG. 5C shows in a cross-sectional view the embodiment shown in FIGS. 5A and 5B. In this cross-sectional view it is seen how the effector flange 50 is attached directly to the effector body 4 and the dispensing actuator unit 3. Hence it is shown that these parts in this embodiment are separate parts but it will in one embodiment be shown that these may be integrated into one part. It is shown that the stepper motor 6 is directly attached to the effector flange 50. In this way it is achieved that the effector flange 50 is connected both to the robot (not shown) and to the major parts of the dispensing effector unit 1. Hereby a more simple and reliable alignment of the parts is achieved. It is seen that the outlet of the fluid container 2 is on the one side of the effector flange 50 and the stepper motor is on the other side seen along the longitudinal axis of the whole dispensing effector unit 1.

FIGS. 6A, 6B and 6C shows one embodiment of the autonomous dispensing effector unit 1. Reference numerals to one feature shown in one of the figures will be the same in the other figures and may not necessarily be indicated with a reference numeral in more than one of the figures.

FIG. 6A shows in a partly exploded view one embodiment of the invention. In the shown embodiment the fluid container 2 is attached to the effector body 4 and the effector actuator 3. The effector flange 50 and the effector body are integrated to form one unit. In this embodiment the piston 12 and the fluid container 2 are arranged such that the fluid in the fluid container 2 need not pass through the effector body 4. However, the effector body 4 still has fluid communication to/through the effector actuator 3. Through this fluid communication i.e. an opening in the effector body 4 integrated with the effector flange the piston rod 11 is positioned in order to move the piston 12 (ref. numeral 11 is shown in two places to indicate that it is in fact the same piston rod, shown more clearly in FIG. 6C).

The fluid communication through the effector body 4 and the dispensing actuator 3 may be more visible in an embodiment where the fluid container is drawn further towards the stepper motor 6 e.g. mounted directly with a thread into the effector body 4 (not shown). Extending from the electrical controlling means a piston rod cover 60 is seen protecting the piston rod 11 in its fully retracted position i.e. having the piston 12 the furthest away from the nozzle 7.

FIG. 6B shows in a side view the embodiment shown in FIG. 6A. It is shown how the fluid container 2 is attached to the effector flange 50 (the integrated effector body 4 and the dispensing actuator 3 are not visible). Clamps 61 hold the fluid container 2 in place.

FIG. 6C is a cross-sectional view of the embodiment shown in FIG. 6B. It is seen that a hole for the piston rod 11 is present in the effector flange 50 that in this embodiment integrates both the effector flange, the effector body and the dispensing actuator. The dispensing actuator 3 positions the piston rod 11 in order to achieve a precise movement of the piston rod 11 and thereby the piston 12 moves inside the fluid container 2 towards the nozzle 7. The nozzle may comprise various nozzle tips (not shown) in order to shape the fluid or achieve the best counter pressure to the piston 12 and/or stepper motor 6 to ensure the required expelling of fluid. It is shown that substantially the whole longitudinal axis of the dispensing effector unit 1 comprises a central hole 62 in order for the piston rod 11 to pass through. In this way the long piston rod 11 may push the piston 12 a long distance and hereby dispense fluid over a longer time. The volume of fluid container 2 is obviously not only determined by the longitudinal length of the fluid container but also the diameter. However, in order to have the most design options for the fluid container 2 a long piston rod is desired. The stepper motor 6 have a threaded contact with the piston rod 11. Although no fluid will flow from the piston rod cover 60 to the fluid container 2 a central hole in fact provide fluid communication from the fluid container 2 through the integrated effector body 4 as well as the dispensing actuator 3 via the stepper motor and the controlling means 9 to the piston rod cover 60. It is seen that the outlet of the fluid container 2 is on the one side of the effector flange 50 and the stepper motor is on the other side seen along the longitudinal axis of the whole dispensing effector unit 1. In this embodiment, the outlet of the fluid container 2 is the nozzle itself.

FIGS. 7A, 7B and 7C shows one embodiment of the autonomous dispensing effector unit 1. Reference numerals to one feature shown in one of the figures will be the same in the other figures and may not necessarily be indicated with a reference numeral in more than one of the figures.

FIG. 7A shows in a partly exploded view one embodiment of the autonomous dispensing effector unit 1. In this embodiment the fluid container is a tube 70 connected to the effector body 4. Having a fluid tube 70 connected directly to the effector body 4 it is provided that the autonomous dispensing effector unit 1 is not restricted to the volume of a local fluid container but may be in fluid communication with a larger external fluid container (not shown). The effector body 4 is connected to the effector flange 50. In this embodiment the effector flange 50 and the effector body 4 are two separate parts but in other embodiments these may be integrated into one part. The effector body 4 is connected to the dispensing actuator unit 3. In this embodiment a stepper motor 6 is connected to a mechanical screw 5 in order to move the fluid from the fluid tube 70 to the nozzle 7. The fluid from the fluid tube 70 is fed to the dispensing actuator unit 3 via the effector body 4. An electrical controlling means 9 comprising an electrical interface 51 is connected to the stepper motor 6. It is to be understood that for all embodiments of the present invention the stepper motor and the electrical controlling means 9 may swap positions with minor modifications i.e. a longer shaft and a throughgoing hole in the controlling means 9.

FIG. 7B shows a side view of the embodiment shown in FIG. 7A. It is shown that the effector flange 50 is positioned between the dispensing actuator 3 and the stepper motor 6. The fluid tube is connected to the side of the dispensing actuator 3 via the effector body 4 (not shown).

FIG. 7C shows in a cross-sectional view the embodiment of the dispensing effector unit 1 shown in FIGS. 7A and 7B. It is shown that the fluid tube 70 is connected to the dispensing actuator 3 via the effector body 4. The effector body 4 and the dispensing actuator 3 are both directly connected to the effector flange 50. Thereby the effector flange provides a common surface for the effector body 4 and the dispensing actuator 3. This ensures that the effector body 4 and the dispensing actuator 3 are more easily aligned at the desired position.

FIG. 8 is a perspective view of the embodiment shown in FIG. 6A-6C. It shows how the effector flange 50 projects substantially perpendicular to the longitudinal axis of the autonomous dispensing effector unit. Hence, the effector flange provides room for the connection to the robot (not shown).

Although the invention has been described in the above in connection with preferred embodiments of the invention, it will be evident for a person skilled in the art that several modifications are conceivable without departing from the invention as defined by the following claims.

The invention claimed is:

1. An autonomous dispensing effector unit for a robotic arm, comprising:
   an effector body,
   a fluid container attached to the effector body, the fluid container comprises an interior volume configured to hold a fluid to be dispensed,
   a dispensing actuator unit attached to the effector body,
   a controller configured to control dispensing from the effector unit, and
   an interface to the controller configured to provide power to the autonomous dispensing effector unit, wherein the dispensing actuator unit and/or the effector body is in fluid communication with the interior volume of the fluid container
   wherein the dispensing actuator unit further comprises a mechanical screw configured to dispense the fluid from the fluid container, the mechanical screw being in fluid communication with the interior volume.

2. An autonomous dispensing effector unit according to claim 1, further comprising a motor configured to drive the mechanical screw.

3. An autonomous dispensing effector unit according to claim 1, wherein the fluid container comprises an energy source detached from an energy source of the dispensing actuator unit.

4. An autonomous dispensing effector unit according to claim 1, wherein the fluid container is slidably arranged on the effector body.

5. An autonomous dispensing effector unit according to claim 1, wherein the dispensing effector unit comprises an electrical interface to the controller.

6. An autonomous dispensing effector unit according to claim 1, wherein pressure in the fluid container is obtained by an energy source different from an energy source driving the dispensing actuator unit.

7. An autonomous dispensing effector unit according to claim 6, wherein the energy source for the fluid container is a spring, pressurized air, a battery-driven motor or gas.

8. An autonomous dispensing effector unit according to claim 1, wherein the effector body is integrated into either the fluid container or the dispensing actuator unit.

9. An autonomous dispensing effector unit according to claim 1, wherein the fluid to be dispensed is a high viscous fluid.

10. An autonomous dispensing effector unit according to claim 1, wherein an interface from the effector body to the fluid container is a tongue and groove connection.

11. An autonomous dispensing effector unit according to claim 10, wherein the tongue and groove is dovetail shaped.

12. An autonomous dispensing effector unit according to claim 1, wherein the fluid container comprises a spring-loaded piston.

13. An autonomous dispensing effector unit according to claim 1, wherein the effector body comprises an effector flange arranged between the controller and the fluid dispensing actuator unit.

14. A method dispensing fluids in patterns according to the movement of the robotic arm to which it is mounted, using the autonomous dispensing effector unit of claim 1.

* * * * *